Dec. 16, 1958      H. R. NEWELL      2,865,000
AUTOMATIC VOLT-OHMETER

Filed Feb. 15, 1954      2 Sheets-Sheet 1

Inventor,
Harold R. Newell,
by Heard, Smith, Porter & Chittich
Att'ys.

Dec. 16, 1958  H. R. NEWELL  2,865,000
AUTOMATIC VOLT-OHMETER
Filed Feb. 15, 1954  2 Sheets-Sheet 2

Inventor,
Harold R. Newell,
by Heard, Smith, Porter + Chittick
Attys.

2,865,000

AUTOMATIC VOLT-OHMETER

Harold R. Newell, Bradford, N. H.

Application February 15, 1954, Serial No. 410,246

8 Claims. (Cl. 324—115)

This invention relates to electrical measuring instruments and more particularly to an automatic volt-ohmeter having a self-adjusting range so that when connected for measurements, the meter automatically selects the correct range to bring reading within the scale calibrations of the meter simultaneously presented on the face of the meter. This prevents damage to the meter and provides ease and accuracy of reading.

Due to the construction of this device it may be employed to automatcally indicate resistance or voltage ranges, the device being equally applicable to voltage measurements of alternating current or direct current.

An object of this invention is to eliminate the necessity of a meter having a multiplier for computing the proper measured values.

Another object of this invention is to provide an automatic volt-ohmeter having fewer parts than instruments of this nature heretofore available.

Still another object of this invention is to provide a multiranged device for measuring electrical values which has the flexibility to be applicable in part to existing measuring circuits and having sufficient simplicity to permit construction of a single unitary device embodying the features of an ohmeter, a D. C. volt meter, and an A. C. volt meter.

Another object of this invention is to provide an electrical measuring device wherein the input to the device is employed to automatically change the calibrations of a meter to conform to the range of the electrical values to be measured.

Figure 1:
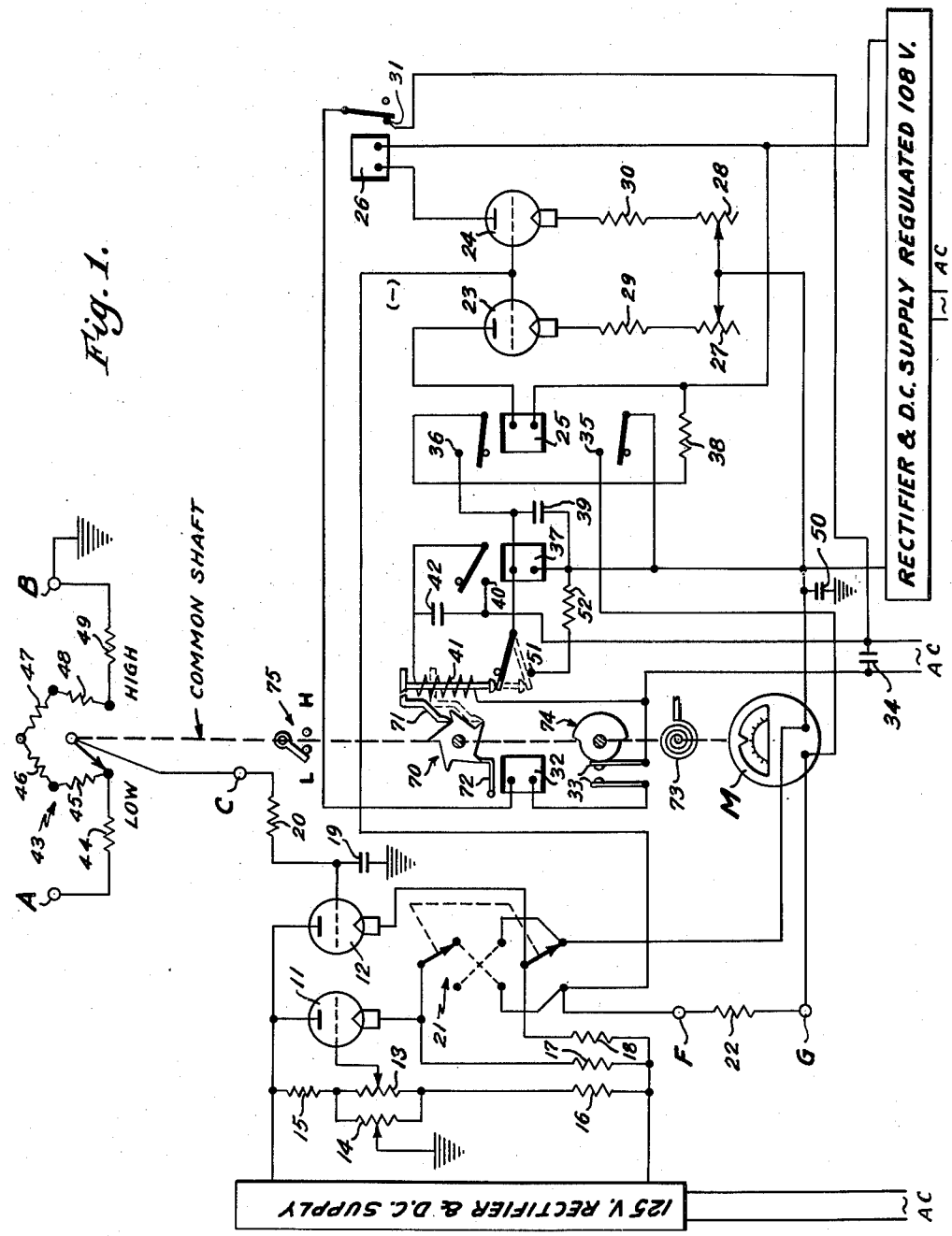
Figure 2:
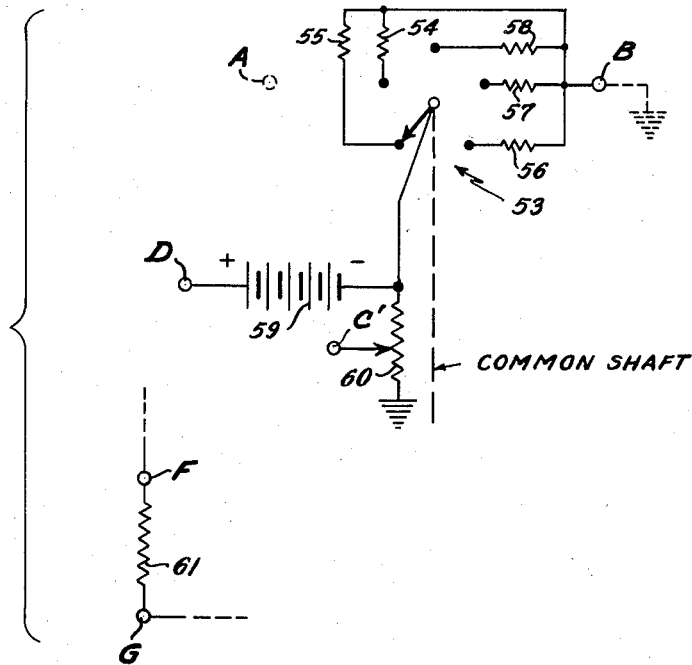
Figure 3:
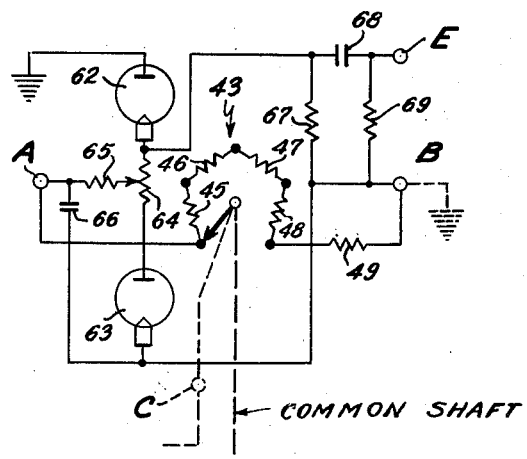

Other objects and many of the attendant advantages of this invention will be readily appreciated as the same become better understood by reference to the accompanying drawings, wherein:

Fig. 1 is a schematic circuit diagram of one embodiment of the invention including elements necessary for D. C. voltage measurements;

Fig. 2 schematically illustrates additional circuit components to be connected for resistance measurements; and, Fig. 3 schematically shows the circuit diagram of additional components which can be connected to the invention for A. C. measurements.

Referring to Fig. 1, the illustrated invention includes a balanced bridge circuit comprising a pair of triodes 11 and 12 connected in combination with resistance elements 13, 14, 15, 16, 17 and 18. The anodes and cathodes of tubes 11 and 12 are connected to a suitable source of D. C. potential. Potentiometer 13 functions as a zero setting control. Potentiometer 14 is employed to set the operating point of potentiometer 13 and once adjusted, it need not be adjusted again except when parts are replaced. Resistance elements 15 and 16 are dropping resistors which make possible application of the correct potential to the terminals of potentiometers 13 and 14. Coupled to the grid of triode 12 by means of resistance 20 and switch 43 is a voltage divider network comprising resistance elements 44, 45, 46, 47, 48 and 49. The rotating element of switch 43 may be successively coupled to the junction points of the resistors of the divider network by rotating it. Capacitor 19 is connected between the grid of triode 12 and ground to filter alternating current from the input of triode 12. Meter M is connected in series across the output of the bridge circuit through resistance 22 and double-pole double throw switch 21. Switch 21 provides polarity reversal for D. C. measurements.

The output of the bridge as it appears across resistance 22 and meter M is applied to the grids of triodes 23 and 24. Coupled in the plate circuits of triodes 23 and 24 are relays 25 and 26. These relays are adapted to be closed when no voltage is applied to the grids of tubes 23 and 24. Potentiometers 27 and 28 operate to control the plate current of tubes 23 and 24. Resistors 29 and 30 are connected in the cathode circuits of tubes 23 and 24 in order to provide the proper cathode potential. Relays 25 and 26 are connected to a source of D. C. potential. Relay 37 is similarly connected to the same source. Contacts 36 on the armature of relay 25 control direct current flow through relay 37 in series with limiting resistance 38. Contacts 40 of relay 37 control alternating current flow through range change racheting solenoid 41, actuating the solenoid when closed. When actuated the solenoid closes contacts 51. Contacts 40 close when contacts 26 of relay 25 open. A condenser 42 is connected across contacts 40 to suppress sparking at the contacts. Contacts 35 close to short meter M when relay 25 opens.

Solenoid 41 is coupled through contacts 40 to a source of alternating current. Connected to the solenoid is a pawl 71 which advances ratchet wheel 70 one position each time solenoid 41 is energized by closing of relay 37. Ratchet wheel 70 is mounted on a shaft mechanically connecting meter M to switch 43. Ratchet wheel 70 as illustrated has five points, thereby permitting the pawl to move the shaft through five positions. Meter M is provided with an indicating scale having five ranges, each of these ranges being successively positioned as the shaft is rotated. Ratchet wheel stop 72 prevents return of the ratchet wheel to its original position except when desired. Also mounted on the mechanical shaft is a spring 73 which is biased in a direction such that it tends to return the shaft to its initial position. In this case the initial position is when the rotating element of switch 43 is in the position shown in Fig. 1. Also provided on the shaft is a mechanical stop 75 which limits rotation of the shaft, the limits being indicated at "Low" and "High," in Fig. 1. The mechanical shaft is also provided with a cam 74 which operates upon rotation of the shaft to close contacts 33 in one position and to permit contacts 33 to separate in a second position.

Reset relay 32 operates through ratchet wheel stop 72 to hold each range until actuated. When actuated relay 32 allows spring 73 to return the shaft to its original position. Reset relay 32 is actuated only when contacts 33 are closed at the same time that contacts 31 of relay 26 is closed, operation of relay 26 being controlled by the signal applied to the grid of tube 24. A capacitor 34 is provided to suppress sparking at contacts 31 and 33. A capacitor 50 is provided to bring the negative connections of triodes 23 and 24 to the same A. C. potential as the ground terminal B.

Operation of this device is as follows:

The tubes of the circuit are allowed to heat, after which the indication on the meter provided by the conventional needle or pointer is brought to zero by adjusting zero set potentiometer 13. This causes the potential on the grids of tubes 23, 24, to be zero due to the fact that the bridge is in a balanced condition.

A D. C. voltage to be measured is then applied between terminals A and B. If the voltage applied between terminals A and B is not excessive for the range of the scale in position on the meter, the circuit causes no movement of ratchet wheel 70. However, if the voltage applied to terminals A and B is beyond a predetermined point on the scale or exceeds the range of the scale in position on the meter, the voltage applied to the grid of tube 12 causes the bridge to become unbalanced, and the output of the bridge is applied to the grids of tubes 23 and 24. The voltage applied to the grid of tube 23 causes the plate current to change sufficiently to open the armature of relay 25. When relay 25 is closed, the normal condition, a closed direct current circuit exists comprising a D. C. supply, resistor 38, contacts 36, relay 37, and the supply. However, when relay 25 opens, relay 37 closes, thereby permitting alternating current to flow through solenoid 41 and causing the pawl to advance the ratchet wheel 70 one position. Closing of solenoid 41 causes contacts 51 to short relay 37 and condenser 39 through resistance 52. Shorting of relay 37 causes contacts 40 to open. Opening of contacts 40 causes the solenoid to open and the short circuit across relay 37 is removed. As is apparent, the time duration for completion of this action is determined by the values of the capacitor 39 and resistors 38 and 52.

Rotation of ratchet wheel 70 causes the rotatable element of switch 43 to rotate to the junction of resistors 45 and 46, changing the voltage applied to the grid of tube 12. If the pointer of meter M then reads on the scale which has been moved into position by advancement of the ratchet wheel, the voltage applied to the grid of tube 23 is insufficient to cause opening of relay 25, and relay 25 remains closed to prevent further range changing action. If meter M still does not read on scale, the range changing action provided by the circuit continues until the meter reads on scale.

Preferably when the voltage output of the bridge circuit reaches a value proximately equal to 1/10 of the scale of the meter or greater, sufficient voltage is applied to the grid of tube 24 to open relay 26. When relay 26 is opened, the alternating current circuit of relay 32 is broken and the ratchet wheel is prevented from returning to its original position. If the voltage output is less than 1/10th, relay 26 remains closed. When the meter is at its lowest range position contacts 33 are open due to the position of cam 74. Therefore with relay 26 closed, due to the fact that the voltage appearing on the tap of switch 43 is less than 1/10, relay 22 is not actuated, and stop 72 remains in contact with the ratchet wheel. If the meter is not at its lowest range position, contacts 33 are closed due to the position of cam 74, and reset relay 32 is actuated when the reading drops below 1/10 of the scale since relay 26 is also closed. Stop 72 thereupon moves out of contact with wheel 70 and the spring returns the shaft to its original position. Relay 32 holds each range, i. e. prevents the shaft from returning to its original position, until actuated. In this case this occurs when the D. C. voltage to be measured is removed from terminals A and B. Solenoid 41, as is evident from the figure, ratchets the scale of meter and the rotating element of switch 43 ahead one position each time the solenoid is actuated.

Fig. 2 illustrates an alternative combination to be connected at terminal C in place of the voltage divider network and the switch element of Fig. 1. This alternative arrangement adapts the invention for measurement of resistance. In this case a circuit comprising switch 53 and resistance elements 54 through 58 are substituted for switch 43 and resistances 44 through 49 with terminal C' of Fig. 2 connected to terminal C of Fig. 1, terminal B' of Fig. 2 connected to terminal B of Fig. 1, and corresponding connections of elements 44 through 49 being removed. Terminal A is shown in dotted lines in Fig. 2 merely for the purpose of illustrating the relative position of the resistance measurement circuit in the device of Fig. 1. However, when the resistance measurement circuit of Fig. 2 is coupled to terminal C of Fig. 1, terminal A is not connected. A source of known potential, e. g. a battery 59, is connected through zero centering potentiometer 60 between terminals C' and D. The resistance to be measured is coupled between terminals D and B. Preferably a resistance 61 of larger value is substituted by suitable switch means (not shown) for smaller resistance 22 between terminals F and G in Fig. 1 in order that the voltage applied to the grid of tube 23 will be increased to cause range scale adjustment with less deflection of the meter pointer.

In Fig. 3 a third alternative embodiment is illustrated. This alternative construction is employed to adapt the device for A. C. voltage measurement. A plurality of resistance elements corresponding to resistors 45 through 49 of Fig. 1 are employed together with diodes 62 and 63, resistances 64, 65, 67 and 69, and capacitors 66 and 68 to provide a D. C. isolating and balanced rectifier circuit. While the circuit of Fig. 3 is shown as a unitary substitute for the circuit connected between terminals A and B of Fig. 1, it is obvious that diodes 62 and 63, resistances 64, 65, 67 and 69, and capacitors 66 and 68, may be connected by suitable switch means to the same network of Fig. 1 to provide a rectifier circuit as in Fig. 3. For this reason numerals 45—49 are employed in both Figs. 1 and 3 to indicate that the same resistor network is employable in both applications of the present invention. While the network of Fig. 1 may be employed unchanged, preferably resistor 44 is omitted, since diodes 62 and 63 introduce slight additional resistances. Terminals E and B serve as input terminals, and switch 43 couples this circuit to terminal C of the device of Fig. 1.

Although the embodiments of Figs. 1, 2, and 3 are shown in disconnected relationship, the embodiments of Figs. 2 and 3 being mentioned hereinabove as substitutes for the voltage divider network of Fig. 1, it is obvious that all three embodiments may be incorporated in a single volt-ohmeter unit, suitable switching means (not shown) being employed to switch in any one of the three embodiments for measurement. Since this device is equally applicable to measurement of resistance and voltages, it is preferred that the meter scale have calibrations providing for both resistance and voltage readings. Such a meter may have two groups of changeable calibrations for resistance and voltage on the same scale, the scale being rotatably mounted in the meter.

Obviously many modifications and variations of the present invention are possible in the light of the above teachings. It is therefore to be understood that within the scope of the appended claims the invention may be practised otherwise than as specifically described.

I claim:

1. Apparatus for measuring electrical values comprising in combination, a balanced bridge circuit, means including a voltage divider network having a movable switch arm for deriving an input voltage proportional to the electrical value to be measured, means for applying said voltage to said bridge circuit, means for deriving an output from said bridge circuit proportional to said input voltage, a metering device having a scale with a plurality of ranges of calibrations, said scale being movable to successively position said ranges on the face of said meter, means for applying said bridge output to said metering device to provide a reading, mechanical means coupled to said metering device for adjustably positioning the scale of said meter to within the range of the electrical value to be measured, means responsive to the output of said bridge circuit for actuating said mechanical means to an extent determined by the magnitude of said bridge output, and means coupled to said mechanical means to change the position of said switch arm simultaneously with movement of the scale of said meter by said mechanical means whereby to reduce the magnitude of said input voltage.

2. Apparatus of claim 1 further including means coupled to the output of said bridge circuit operable to restore the scale of said meter to its original position when the output of said bridge circuit falls below a predetermined value.

3. Apparatus for measuring electrical values comprising in combination means for deriving an input voltage proportional to the electrical value to be measured, a meter provided with indicating means and a scale having a plurality of ranges of calibrations, means connecting said meter to measure said electrical value, said scale being movable to successively position each of said ranges on the face of said meter, means for applying said input voltage to said meter, a rotatable shaft to which said scale is connected for rotation therewith, whereby to successively position each of said ranges on the face of siad meter, a ratchet wheel carried by said shaft, a solenoid, means carried by said solenoid for turning said ratchet wheel, whereby to advance said scale from one range to another when said solenoid is repeatedly energized, and means responsive to said input voltage for energizing said solenoid for a limited period of time when said input voltage is above a predetermined value, said last mentioned means being adapted to repeatedly energize said solenoid until said input voltage drops below said predetermined value, and means movable with said rotatable shaft for varying the magnitude of said input voltage.

4. Apparatus for measuring electrical values comprising in combination, means for deriving an input voltage proportional to the electrical value to be measured, which means includes a voltage divider network having a movable switch arm for varying the magnitude of said input voltage, said arm being operatively connected to a rotatable shaft whereby to rotate therewith, a balanced bridge circuit, means for applying said input voltage to said balanced bridge circuit, a solenoid, means actuated by said solenoid for rotating said shaft a limited amount each time said solenoid is actuated, means coupled to said balanced bridge for repeatedly energizing said solenoid to cause rotation of said shaft, said last-mentioned means functioning to repeatedly energize said solenoid so long as the output voltage of said bridge circuit is above a predetermined value, a meter having a variable scale for indicating the magnitude of the electrical value to be measured, said scale being connected to said shaft for rotation therewith, means coupling the output voltage of said bridge circuit to said meter and means for changing said variable scale in accordance with rotated position of said shaft.

5. Apparatus for measuring electrical values comprising in combination, means for deriving an input voltage proportional to the electrical value to be measured, said means including a plurality of resistors of predetermined value connected in series with a tap connected to the end of each resistor and a movable switch arm adapted to successively engage the taps, a balanced bridge circuit, means for applying said input voltage to said bridge circuit, means for deriving an output voltage from said bridge circuit proportional to said input voltage, a meter having a movable indicating means and a scale provided with a plurality of ranges of calibrations, said scale being movable to successively locate each of said ranges on the face of the meter in position to be read by said indicating means, means for applying said output voltage to said meter, a ratchet wheel, means connecting said ratchet wheel and said movable switch arm whereby said switch arm is caused to engage successive taps to reduce the value of said input voltage as said ratchet wheel is rotated in a first direction, means connecting said meter scale and said arm for moving said scale to position a new range of calibrations on the face of said meter each time said arm is advanced from one tap to another tap, mechanical means for rotating said ratchet wheel in said first direction, a solenoid for actuating said mechanical means whereby to cause said ratchet wheel to rotate in said first direction, a control circuit including a vacuum tube for energizing said solenoid to actuate said mechanical means, thereby to cause said switch arm to move from one tap to another, and means for applying the output voltage in said bridge circuit to said vacuum tube, said control circuit being adapted to cause energization of said solenoid when the voltage output of said bridge exceeds a predetermined value.

6. Apparatus as defined by claim 5, further including means for de-energizing said solenoid after said solenoid has caused said mechanical means operating through said ratchet wheel to advance said switch arm from one tap to a successive tap, whereby said solenoid may be reenergized to advance said switch arm to the next immediate tap if said output voltage still exceeds said predetermined value.

7. Apparatus as defined by claim 5, further including a holding stop for said ratchet wheel, said stop normally permitting said ratchet wheel to be turned only in said first direction and preventing said ratchet wheel from turning in the opposite direction, a relay for releasing said stop to permit said ratchet wheel to turn in the opposite direction, means for rotating said ratchet wheel in said opposite direction to return said switch arm to its original position when said stop is released by said relay, and means for actuating said relay to release said stop when said output voltage drops below a predetermined minimum value.

8. Apparatus for measuring electrical values comprising in combination, a voltage divider network for deriving an input voltage proportional to the electrical value to be measured, said network including a plurality of resistors of predetermined values connected in series with a tap connected to the end of each resistor, and a movable switch arm adapted to successively engage the taps whereby to vary the magnitude of said input voltage, a balanced bridge circuit, means for applying said input voltage to said bridge circuit, a meter having a movable scale, means for applying the output of said bridge circuit to said meter, a solenoid, means controlled by said solenoid for advancing said switch arm from one tap to another whereby to vary said input voltage in a stepwise manner, means for moving said scale as said switch arm is moved from one tap to another tap, means responsive to the output voltage of said bridge circuit for energizing said solenoid only when the magnitude of said output voltage is above a predetermined value, and means for restoring said switch arm to its original position when said output voltage drops below a predetermined minimum value.

References Cited in the file of this patent

UNITED STATES PATENTS

| | | |
|---|---|---|
| 1,240,590 | Okey | Sept. 18, 1917 |
| 2,118,933 | Macadie | May 31, 1938 |
| 2,400,190 | Clark | May 14, 1946 |
| 2,466,558 | Sadlon | Apr. 5, 1949 |
| 2,497,961 | Shaw | Feb. 21, 1950 |
| 2,533,091 | Campani | Dec. 5, 1950 |
| 2,643,344 | MacLaren et al. | June 23, 1953 |
| 2,661,260 | Salzman | Dec. 1, 1953 |
| 2,754,471 | Mayer | July 10, 1956 |